United States Patent
Garg et al.

(10) Patent No.: US 6,287,393 B1
(45) Date of Patent: Sep. 11, 2001

(54) PROCESS FOR PRODUCING CARBURIZING ATMOSPHERES

(75) Inventors: Diwakar Garg, Emmaus; John Nelson Armor, Orefield; Daniel Joseph Martenak, Dublin; Paul Titus Kilhefner, Wescosville, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/390,080

(22) Filed: Sep. 3, 1999

(51) Int. Cl.[7] .................................. C23C 8/20; C23C 8/22
(52) U.S. Cl. .......................... 148/206; 148/225; 148/235
(58) Field of Search ..................................... 148/225, 206, 148/235

(56) References Cited

U.S. PATENT DOCUMENTS

| 4,049,472 | 9/1977 | Arndt . |
| 4,386,972 | * 6/1983 | Knight ................................. 148/16 |
| 4,859,434 | * 8/1989 | Roberts et al. ...................... 423/219 |
| 5,336,655 | 8/1994 | Basini et al. . |

FOREIGN PATENT DOCUMENTS

| 43 43 927 C1 | 12/1993 | (DE) . |
| 0 692 451 A1 | 1/1997 | (EP) . |
| 2 170 508 A | 8/1986 | (GB) . |
| WO 90/03218 | 4/1990 | (WO) . |

OTHER PUBLICATIONS

P. Murzyn et al., Carburizing with membrane $N_2$: process and quality issues, Linde Div., Union Carbide Corp., date unavailable.

Song–Bai Tang et al., "Combined Parital Oxidation And Carbon Dioxide Reforming Of Methane Process To Synthesis Gas", Journal of Natural Gas Chemistry, vol. 5, No. 3, 1996, pp. 272–277.

Ashcroft et al., "Partial oxidation of methane to synthesis gas using carbon dioxide", Nature, vol. 352, Jul. 18, 1991, pp. 225–226.

Ruckenstein et al., Interesting Combination of $CO_2$ Reforming and Methane Partial Oxidation . . . , Industrial Engineering Chemistry Research, vol. 37, No. 5, May 1998, pp. 1744–1747.

S.C. Tsang et al., "Recent advances in the conversion of methane to synthesis gas", Catalysis Today 23, 1995, pp. 3–15.

Zhen Kaiji et al., Effect of $La_2O_3$ on the Nickel Catalysts for Methane Reforming with $CO_2$, Jilin University date unavailable.

Ping Chen et al., Coke–Resistant Ni–based Cataystt for Partial Oxidation and $CO_2$–Reforming of Methane to Syngas, Chemical Research in Chinese Universities, vol. 13, No. 1 (1997), pp. 83–86.

Toshio Uchijima et al., "Production of Synthesis Gas by Partial Oxidation of Methane and Reforming of Methane with Carbon Dioxide", Institute of Materials Science, Univ. of Tsukuba, 1994, pp. 325–327.

K. Seshan et al., "Carbon dioxide reforming of methane for syngas production—Promises and pitfalls", Catalytic Processes and Materials Group, University of Twente, 1997, pp. 2–11.

S. Wang et al., "Carbon Dioxide Reforming of Methane To Produce Synthesis Gas over Metal–Supported Catalysts: State of the Art", American Chemical Society, 1996, pp. 895–904.

Z. Zhang et al., "A Stable and Active Nickel–based Catalyst for Carbon Dioxide Reforming of Methane to Synthesis Gas", J. Chem. Soc., Chem. Commun., 1995, pp. 71–72.

O. Yamazaki et al., "Development of Active and Stable Catalysts for Methane Reforming with Steam and $CO_2$", Dept. of Applied Chemistry, Faculty of Engineering, Univ. of Tokyo, 1995, pp. 71–72.

K. Bennett et al., "Operating Experience with Nitrogen/Methanol Atmospheres in Continuous Carburising Furnaces", Heat Treatment of Metals, 1985, pp. 17–19.

"Furnace Atmospheres and Carbon Control", ASM Committee on Furnace Atmospheres, date unavailable.

* cited by examiner

*Primary Examiner*—Roy King
*Assistant Examiner*—Nicole Coy
(74) *Attorney, Agent, or Firm*—Willard Jones, II

(57) ABSTRACT

An improved process for producing an atmosphere suitable for carburizing steel components by adding a small amount of oxygen to a mixture of natural gas and carbon dioxide, pre-heating the mixture to the desired reaction temperature in the presence of an inert material or a non-nickel-based catalyst that promotes the reaction between oxygen and natural gas without forming coke to avoid catalyst deactivation by coke formation, and reacting natural gas with carbon dioxide at high temperature in the presence of a catalyst.

42 Claims, No Drawings

PROCESS FOR PRODUCING CARBURIZING ATMOSPHERES

CROSS REFERENCE TO RELATED APPLICATIONS

Not Applicable

STATEMENT REGARDING FEDERALLY SPONSORED RESEARCH OR DEVELOPMENT

Not applicable

BACKGROUND OF THE INVENTION

Carbon is routinely added to surfaces of carbon steel components by known carburizing techniques. One of the known processes uses a carburizing atmosphere in a furnace used to heat the components to an elevated temperature to increase the carbon content of the steel surface to a controlled depth, so that the carburized piece has increased surface hardness and wear resistance after hardening. The function of a carburizing atmosphere is to provide carbon potential in the furnace and transfer carbon to the surface of carbon steel components. The carburizing process is generally carried out in a batch or continuous furnace operated at temperatures between 750° C. to 950° C. (1380° F. to 1750° F.). The rate of carburization (carbon transfer or carbon addition to the surface) depends upon the carbon potential in the furnace, the carbon potential being determined by carburizing temperature and carburizing gas composition. Although temperature plays a key role in controlling the rate of carburization, gas composition can play an important role in manipulating the rate of carburization during early stages of carburization. For example, the rate of carburization can be accelerated during early stages of carburization by increasing the partial pressure of carbon monoxide in the furnace atmosphere, as practiced in rapid carburization and accelerated carburization processes.

A wide variety of atmospheres have been employed to provide the desired carbon potential in a furnace in order to transfer carbon to the surface of carbon steel components being heated in the furnace. For example, pure methane or natural gas has been employed to carburize steel components. However, the use of methane or natural gas produces large amounts of soot in the furnace, causing the life of furnace components to be shortened. Furthermore, it is difficult, if not impossible, to carburize steel components in a controlled and consistent fashion with methane or natural gas. Therefore, pure methane or natural gas is rarely employed these days to carburize carbon steel components.

A gaseous mixture consisting primarily of 20% carbon monoxide, 40% hydrogen, and 40% nitrogen that is produced by using an endothermic generator has been employed for carburizing carbon steel components for many years. This gaseous mixture is produced by reacting mixture of a hydrocarbon gas such as natural gas or propane and air at high temperature (above about 980° C., 1796° F.) in a reactor packed with a nickel catalyst supported on alumina. It has, however, been difficult to maintain quality and consistency of endothermic atmosphere because of constant changes in the composition of the air entering the generator and the decrease in activity of the nickel catalyst with time. The activity of the catalyst changes with time due to deactivation by coke formation. Furthermore, because of catalyst deactivation with time by coke formation, it is not possible to use an endothermic generator to continuously produce carburizing atmosphere because the generator needs to be shut down periodically to regenerate the catalyst. Numerous advances in the design and operation of endothermic generators have been made over the years, including incorporation of an oxygen probe (or carbon probe) to improve quality and consistency of the endothermic atmosphere, but these changes have not yet solved all of the problems associated with this equipment.

Carburizing atmospheres consisting primarily of one part carbon monoxide and two parts hydrogen, produced by dissociating pure methanol, have been used for carburizing carbon steel components to overcome quality and consistency issues related to an endothermically generated atmosphere. Likewise, carburizing atmospheres consisting of 20% carbon monoxide, 40% hydrogen and 40% nitrogen produced by dissociating methanol in the presence of nitrogen, have been employed for carburizing carbon steel components. However, the use of methanol is becoming increasingly unpopular these days, due to its toxicity.

Carburizing atmospheres consisting of 20% carbon monoxide, 40% hydrogen and 40% nitrogen produced by dissociating methanol in the presence of non-cryogenically generated nitrogen have been employed for carburizing carbon steel components. The non-cryogenically generated nitrogen is produced from air by using either a pressure swing adsorption (PSA) or a membrane system. The nitrogen produced by these systems usually contain 1 to 5% residual oxygen as an impurity. The nitrogen with oxygen impurity at these levels has been used as a substitute for pure nitrogen, primarily to reduce overall cost of producing carburizing atmospheres. A small amount of natural gas is added to the atmosphere to compensate for oxygenated species such as carbon dioxide and moisture generated by using non-cryogenically generated nitrogen. Once again, as mentioned earlier, the use of methanol is becoming increasingly unpopular due to its toxicity.

A mixture of pure nitrogen, a hydrocarbon gas (methane or natural gas or propane), and carbon dioxide has been introduced directly in a batch carburizing furnace to produce a carburizing atmosphere in-situ, as disclosed and claimed in U.S. Pat. No. 4,049,472. According to patentees, carbon dioxide reacts with methane at a temperature in excess of 1500° F. (815° C.) inside the furnace, thereby producing the desired carburizing atmosphere. In reality, however, it has been found that the rate of thermal reaction between carbon dioxide and the hydrocarbon gas at a temperature in excess of 1500° F. (815° C.), is not high enough to produce the desired 20% concentration of carbon monoxide in the atmosphere. Furthermore, carbon steel components treated using the process claimed in this patent are surface decarburized rather than surface carburized. Finally, it has been found via experimentation that a temperature in excess of 1750° F. (950° C.) is required to produced a carburizing atmosphere in-situ from a mixture of pure nitrogen, carbon dioxide and a hydrocarbon gas. A temperature in excess of 1750° F. (950° C.) is generally not acceptable for carburization of carbon steel parts because of the potential of the carburized parts to have severe distortion and deformation. Therefore, the process disclosed in this patent is not suitable for producing carburizing atmospheres from a mixture of pure nitrogen, carbon dioxide and a hydrocarbon gas.

A carburizing atmosphere has been produced by substituting carbon dioxide partially or fully for air that is used to react with the hydrocarbon gas in an endothermic generator, as disclosed in German Patent DE 4343927 C1. According to this patent, the partial substitution of air with carbon dioxide produces a carburizing atmosphere with a more desirable hydrogen to carbon monoxide ratio of between 1 and 2. The complete substitution of air with carbon dioxide produces a carburizing atmosphere with 50% carbon monoxide and 50% hydrogen and a hydrogen to carbon monoxide ratio of 1. It has been unexpectedly observed that by substituting carbon dioxide completely for air in an endothermic generator used to produce a carburizing atmosphere, catalyst deactivation by coke formation occurs.

Synthesis gas consisting of a mixture of carbon monoxide and hydrogen (suitable for carburizing) can be produced by combined partial oxidation and carbon dioxide reforming of methane, as disclosed in papers by S. B. Tang et al. and A. T. Ashcroft et al. The synthesis gas or the product from combined partial oxidation and carbon dioxide reforming of methane contains a substantial amount of unreacted carbon dioxide. The combined partial oxidation and carbon dioxide reforming of methane, therefore, can be used to produce carburizing atmospheres, provided substantially all of carbon dioxide is removed from the product gas.

A number of nickel, rhodium, ruthenium, iridium, and platinum-based catalysts have been studied to produce synthesis gas or a mixture of carbon monoxide and hydrogen (suitable for carburizing) by reforming methane with carbon dioxide (dry reforming). These catalysts have been disclosed in publications by S. C. Tsang et al., J. Min et al., C. Ping et al., T Uchijima et al., K. Seshan et al., and U.S. Pat. No. 5,336,655. The processes disclosed in these papers require the use of pure methane for producing synthesis gas, which then can be used as a carburizing atmosphere. Because pure methane is very expensive, the processes disclosed in these references can not be used to produce carburizing atmosphere cost effectively.

Synthesis gas or a mixture of carbon monoxide and hydrogen (suitable for carburizing) is produced by reforming methane with carbon dioxide (dry reforming), as disclosed in UJK Patent GB 2170508A. According to the disclosed process, the formation of coke on the catalyst is mitigated by using an excessive amount of carbon dioxide. The excess carbon dioxide is then separated from the product gas to produce the desired composition of synthesis gas. Since the process requires an expensive step to remove carbon dioxide from the product gas stream, it is not economical to produce a carburizing atmosphere using this method.

Based upon the above discussion, it is clear that there is a need to develop a process for producing carburizing atmospheres with consistent quality and composition, cost effectively. Furthermore, there is a need to develop a process for producing carburizing atmospheres that (1) is not dependent on changes in the composition of air, (2) does not require expensive unit operations to remove unreacted carbon dioxide, and (3) is not prone to promote frequent catalyst deactivation by coke formation.

SUMMARY OF THE INVENTION

The present invention is an improved process for producing atmospheres suitable for carburizing carbon steel components with consistent quality and composition. According to the processes of the invention, atmospheres suitable for carburizing steel components are produced by (1) adding a small amount of oxygen or air to a mixture of natural gas and carbon dioxide, (2) pre-heating the mixture to the desired reaction temperature in the presence of an inert material or a non nickel-based catalyst that promotes the reaction between oxygen and natural gas without forming coke, and (3) reacting natural gas with carbon dioxide at high temperature in the presence of a catalyst. A distinguishing feature of the invention includes reacting a portion of the natural gas with oxygen or oxygen present in air during pre-heating to avoid catalyst deactivation by coke formation. Carburizing atmospheres according to the invention are produced with consistent quality and composition and cost effectively because the process (1) is not dependent on changes in the composition of air, (2) does not require expensive unit operations to remove unreacted carbon dioxide, and (3) is not prone to frequent catalyst deactivation by coke formation.

Thus in one aspect, the present invention is a process for producing a carburizing atmosphere comprising the steps of: a) preparing a mixture consisting of, by volume, 14 to 50% natural gas, 13 to 50% carbon dioxide, 0 to 73% nitrogen, to which is added from 1% to 5% by volume oxygen b) pre-heating said mixture prepared in step a) to a temperature of between 750° C. (1380° F.) and 950° C. (1750° F.) in the presence of a material that promotes reaction between oxygen and natural gas without forming coke; and to c) reacting said pre-heated mixture of step (b) at temperature in the presence of a catalyst to produce said carburizing atmosphere.

In another aspect, the present invention is a process for producing a carburizing atmosphere comprising the steps of: a) preparing a mixture consisting of, by volume, from 14 to 50% methane, 13 to 50% carbon dioxide and 20 to 73% nitrogen containing 1 to 5% by volume residual oxygen b) pre-heating said mixture prepared in step a) to a temperature of between 750° C. (1380° F.) and 950° C. (1750° F.) in the presence of a material that promotes reaction between oxygen and natural gas without forming coke; and c) reacting said pre-heated mixture of step (b) at temperature in the presence of a catalyst to produce said carburizing atmosphere.

In still another aspect, the present invention is a process for producing a carburizing atmosphere for accelerated carburizing comprising the step of; a) preparing a mixture of essentially equal parts of natural gas and carbon dioxide to which is added approximately from 1% to 5% by volume oxygen; b) pre-heating said mixture prepared in step a) to a temperature of between 750° C. (1380° F.) and 950° C. (1750° F.) in the presence of a material that promotes reaction between oxygen and natural gas without forming coke; and c) reacting said pre-heated mixture of step (b) at temperature in the presence of a catalyst to produce said carburizing atmosphere.

A further aspect of the present invention is, a method for carburizing ferrous metal articles comprising the step of heating said articles to a temperature of from 800° C. (1470° F.) to 950° C. (1750°F.) under an atmosphere produced by: a) preparing a mixture consisting of, by volume, 14 to 50% natural gas, 13 to 50% carbon dioxide, 0 to 73% nitrogen to which is added between 1% and 5% by volume oxygen; b) pre-heating said mixture prepared in step a) to a temperature of between 750° C. (1380° F.) and 950° C. (1750° F.) in the presence of a material that promotes reaction between oxygen and natural gas without forming coke; c) reacting said pre-heated mixture of step (b) at temperature in the presence of a catalyst to produce said carburizing atmosphere; and thereafter holding said articles at temperature and for a time to effect carburnization of said articles to a desired depth.

Another aspect of the present invention is a method for carburizing ferrous metal articles comprising the steps of heating said article to a temperature of from 800° C. (1470° F.) to 950° C. (1750° F.) and an atmosphere produced by: a)

preparing a mixture of essentially equal parts of natural gas and carbon dioxide to which is added between 1% and 5% by volume oxygen; b) pre-heating said mixture prepared in step a) to a temperature of between 750° C. (1380° F.) and 950° C. (1750° F.) in the presence of a material that promotes reaction between oxygen and natural gas without forming coke; c) reacting said pre-heated mixture of step (b) at temperature in the presence of a catalyst to produce said carburizing atmosphere for a time sufficient to effect accelerated carburizing, thereafter continuing said heating under an atmosphere produced by: a) preparing a mixture consisting of, by volume, 14 to 50% natural gas, 13 to 50% carbon dioxide, 0 to 73% nitrogen to which is added from 1% to 5% by volume oxygen; b) pre-heating said mixture prepared in step a) to a temperature of between 750° C. (1380° F.) and 950° C. (1750° F.) in the presence of a material that promotes reaction between oxygen and natural gas without forming coke; and c) reacting said pre-heated mixture of step (b) at temperature in the presence of a catalyst to produce said carburizing atmosphere for a time at temperature to effect carburization of said articles to a desired depth.

DETAILED DESCRIPTION OF THE INVENTION

Carbon is routinely added to surfaces of carbon steel components by known carburizing techniques using a carburizing atmosphere in a furnace used to heat the carbon steel components to an elevated temperature to increase the carbon content of the surfaces of the steel components to a controlled depth, so that the carburized components have increased surface hardness and wear resistance after hardening. The carbon steel components are carburized in a batch or continuous furnace operated at temperatures between 750° C. to 950° C. (1380° F. to 1750° F.) in the presence of a carburizing atmosphere. A wide variety of atmospheres, e.g. using pure methane, natural gas, an atmosphere produced by an endothermic generator, methanol, and nitrogen-methanol have been employed to carburize carbon steel components. The use of methane or natural gas is not desirable because it produces large amounts of soot in the furnace, thereby causing problems with the life of furnace components. The use of an endothermically generated atmosphere is not favored these days because of difficulty in maintaining quality and consistency of an endothermic atmosphere. Likewise, the use of methanol or nitrogen-methanol is decreasing due to the toxicity of methanol.

Carburizing atmospheres can be produced in-situ (or inside the furnace) by reacting natural gas or methane and carbon dioxide at high temperature in the absence of a catalyst, however, extremely high temperatures are required to obtain an acceptable rate of reaction between natural gas and carbon dioxide. These high temperatures are not ideal for carburizing carbon steel components because of the potential for severe distortion and deformation of the components.

Carburizing atmospheres can be produced by substituting carbon dioxide (partially or fully) for the air used to react with a hydrocarbon gas (natural gas or propane) in an endothermic generator. The substitution of carbon dioxide for air does not solve problems related to fluctuation in carburizing atmosphere composition with changes in composition of the air in the case of a partial substitution, or deactivation of catalyst by soot formation in the case of a full substitution.

Carburizing atmospheres can be produced by combined partial oxidation and carbon dioxide reforming of methane, provided, substantially all of the carbon dioxide is removed from the product gas. Similarly, carburizing atmospheres can be produced by reacting methane with carbon dioxide (dry reforming of methane with carbon dioxide) at high temperatures in the presence of a catalyst. However, dry reforming of methane is not a commercially viable process because it results in rapidly deactivating the reforming catalyst by coke formation.

Carburizing atmospheres can be produced by dry reforming of methane with carbon dioxide provided the catalyst deactivation by coke formation problem was solved. The problem with catalyst deactivation by coke formation can minimized or eliminated by using an excessive amount of carbon dioxide, however, the excess carbon dioxide has to be removed from the product gas using expensive unit operations, thereby making the process economically unattractive.

Catalyst deactivation by coke formation in dry reforming of natural gas with carbon dioxide is believed to be related to cracking of methane and higher hydrocarbon impurities such as ethane, propane, butane, etc. present in the natural gas in the entrance portion of the catalytic reactor. Since the rate of reaction between hydrocarbons present in the natural gas and carbon dioxide is slow compared to polymerization of hydrocarbons at high temperatures, hydrocarbons present in the natural gas tend to rapidly polymerize and deposit coke on the catalyst in the entrance portion of the catalytic reactor, thereby deactivating the reforming catalyst by coke formation. It is, therefore, believed that the problem of catalyst deactivation by coke formation can be solved by avoiding polymerization of hydrocarbons present in the natural gas in the entrance portion of the catalytic reactor.

Surprisingly we have found that deposition of coke on the catalyst can be reduced considerably or eliminated by adding a small amount of oxygen or air to the reaction mixture containing natural gas and carbon dioxide and pre-heating the reaction mixture in the presence of either an inert material or a catalyst that does not promote cracking of methane but facilitates reaction between oxygen or oxygen present in the air and natural gas without forming coke. The pre-heating of reaction mixture in the presence of a small amount of oxygen or oxygen present in the air causes a part of natural gas to react with oxygen or oxygen present in the air, thereby producing a mixture of carbon dioxide, carbon monoxide, hydrogen and moisture. The reaction mixture, depleted with oxygen or oxygen present in the air, is then reacted at high temperatures in the presence of a catalyst to produce a carburizing atmosphere without depositing coke on the catalyst, or deactivating the catalyst.

We have also found that catalyst deactivation with coke can be reduced considerably or eliminated by carefully by selecting the amount of oxygen or air added to the reaction mixture and limiting the operating temperature of the reactor to below 950° C. (1750° F.). For example, we have found it is desirable to add between 1 to 5% oxygen or an equivalent amount of air to the reaction mixture to avoid presence of excessive amounts of carbon dioxide and moisture in the reaction product. The presence of excessive amounts of carbon dioxide and moisture in the reaction product are not desirable when trying to carburize carbon steel components. The use of an operating temperature below about 950° C. (1750° F.), on the other hand, reduces both reaction severity and chances of coke formation.

Surprisingly we have also found that is important to carefully select the ratio of natural gas to carbon dioxide to produce a carburizing atmosphere with the desired composition. Since the presence of an excessive amount of carbon dioxide in the final product is not desirable, it is preferable to limit the ratio of natural gas to carbon dioxide in the gaseous feed mixture to approximately 1 or above.

Carbon steel components, as mentioned earlier, can be carburized with an atmosphere containing 20% carbon monoxide, 40% hydrogen, and 40% nitrogen along with impurities in the form of carbon dioxide, moisture and unreacted methane. The word hydrogen as used herein is taken to mean dihydrogen. The hydrogen to carbon monoxide ratio in the above atmosphere is close to 2. It is commonly known that a hydrogen to carbon monoxide ratio of close to 1 is more than sufficient for carburizing carbon steel components. The extra hydrogen present in the atmosphere does not aid the carburizing atmosphere. It is also known that the rate of carburizing can be increased simply by increasing the concentration or partial pressure of carbon monoxide. One can, therefore, call a carburizing atmosphere containing 20% carbon monoxide, irrespective of concentration of hydrogen, to be a "normal" carburizing atmosphere. Likewise, a carburizing atmosphere containing more than 20% carbon monoxide but less than or equal to 50% carbon monoxide can be termed as an "accelerated" carburizing atmosphere.

It is also well known that carburizing processes involve depositing carbon on the surface of the components followed by penetration of carbon deep into the component by diffusion. The deposition of carbon on the surface of components can be accelerated by the increasing partial pressure of carbon monoxide in the atmosphere. That is why a process utilizing more than 20% carbon monoxide is called an accelerated carburizing process. However, the penetration of carbon deep into the component by diffusion is a slow process, and is generally not effected by the concentration of carbon monoxide as long as the atmosphere is not decarburizing in nature. Consequently, a carburizing atmosphere containing 20% carbon monoxide ("normal" carburizing atmosphere) is sufficient to facilitate penetration of carbon deep into the component by diffusion. In order to accelerate the whole carburizing process or reduce cycle time, it is reasonable to employ an "accelerated" carburizing atmosphere for a period of time, followed by switching to a "normal" carburizing atmosphere and maintaining the normal carburizing atmosphere until the desired depth of carburization is achieved. Alternatively, one can switch back and forth between "accelerated" and "normal" carburizing atmospheres to accelerate the overall carburizing process or reduce carburizing time.

According to the present invention, atmospheres suitable for accelerated carburizing steel components (i.e. atmospheres containing between 40 and 50% carbon monoxide) are produced by adding a small amount of oxygen or air to a mixture of natural gas and carbon dioxide, pre-heating the mixture to the desired reaction temperature in the presence of an inert material or a non nickel-based catalyst that promotes the reaction between oxygen or oxygen present in air and natural gas without forming coke, and reacting natural gas with carbon dioxide at high temperature in the presence of a catalyst.

According to one embodiment of the present invention, atmospheres suitable for accelerated carburizing steel components (i.e. atmosphere containing more than 20% but less than 45% carbon monoxide) are produced by mixing nitrogen and a small amount of oxygen or air with natural gas and carbon dioxide, pre-heating the mixture to the desired reaction temperature in the presence of an inert material or a non nickel-based catalyst that promotes the reaction between oxygen or oxygen present in air and natural gas without forming coke, reacting natural gas with carbon dioxide at high temperature in the presence of a catalyst.

According to another embodiment of the present invention, atmospheres suitable for accelerated carburizing steel components (i.e. atmosphere containing more than 20% but less than 45% carbon monoxide) are produced by mixing non-cryogenically produced nitrogen containing 1 to 5% residual oxygen with natural gas and carbon dioxide, pre-heating the mixture to the desired reaction temperature in the presence of an inert material or a non nickel-based catalyst that promotes the reaction between residual oxygen present in non-cryogenically produced nitrogen and natural gas without forming coke, and reacting natural gas with carbon dioxide at high temperature in the presence of a catalyst.

According to yet another embodiment of the present invention, atmospheres suitable for normal carburizing steel components (i.e. atmosphere containing close to 20% carbon monoxide) are produced by mixing nitrogen and a small amount of oxygen or air with natural gas and carbon dioxide, pre-heating the mixture to the desired reaction temperature in the presence of an inert material or a non nickel-based catalyst that promotes the reaction between oxygen or oxygen present in air and natural gas without forming coke, and reacting natural gas with carbon dioxide at high temperature in the presence of a catalyst.

According to still another embodiment of the present invention, atmospheres suitable for normal carburizing steel components (i.e. atmosphere containing close to 20% carbon monoxide) are produced by mixing non-cryogenically produced nitrogen containing 1 to 5% residual oxygen with natural gas and carbon dioxide, pre-heating the mixture to the desired reaction temperature in the presence of an inert material or a non nickel-based catalyst that promotes the reaction between residual oxygen present in non-cryogenically produced nitrogen and natural gas without forming coke, and reacting natural gas with carbon dioxide at high temperature in the presence of a catalyst.

In another embodiment of the present invention, carbon steel components are carburized by using atmosphere suitable for accelerated carburizing followed by an atmosphere suitable for normal carburizing to reduce overall carburizing time. The atmosphere for accelerated carburizing steel components is produced by adding a small amount of oxygen or air to a mixture of natural gas and carbon dioxide, pre-heating the mixture to the desired reaction temperature in the presence of an inert material or a non nickel-based catalyst that promotes the reaction between oxygen or oxygen present in air and natural gas without forming coke, and reacting natural gas with carbon dioxide at high temperature in the presence of a catalyst. After carburizing components with an accelerated carburizing atmosphere for a specified time, the components are carburized using a normal carburizing atmosphere which is produced by mixing nitrogen and a small amount of oxygen or air (or non-cryogenically generated nitrogen containing 1 to 5% residual oxygen) with natural gas and carbon dioxide, pre-heating the mixture to the desired reaction temperature in the presence of an inert material or a non nickel-based catalyst that promotes the reaction between oxygen or oxygen present in air or oxygen present in non-cryogenically produced nitrogen and natural gas without forming coke, and reacting natural gas with carbon dioxide at high temperature in the presence of a catalyst.

A further embodiment of the present invention, is a process where carbon steel components are carburized by an using atmosphere suitable for accelerated carburizing followed by an atmosphere suitable for normal carburizing to reduce overall carburizing time. The atmosphere for accelerated carburizing steel components containing more than 20% carbon monoxide is produced by mixing non-cryogenically produced nitrogen containing 1 to 5% residual oxygen with natural gas and carbon dioxide, pre-heating the mixture to the desired reaction temperature in the presence of an inert material or a non nickel-based catalyst that promotes the reaction between residual oxygen and natural gas without forming coke, and reacting natural gas with carbon dioxide at high temperature in the presence of a catalyst. After the carburizing components with the accelerated carburizing atmosphere for a specified time, the components are carburized using a normal carburizing atmosphere containing close to 20% carbon monoxide. The normal carburizing atmosphere is produced by mixing non-cryogenically produced nitrogen containing 1 to 5% residual oxygen with natural gas and carbon dioxide, pre-heating the mixture to the desired reaction temperature in the presence of an inert material or a non nickel-based catalyst that promotes the reaction between residual oxygen and natural gas without forming coke, reacting natural gas with carbon dioxide at high temperature in the presence of a catalyst.

The inert solid material used to facilitate pre-heating of the reaction mixture close to the reaction temperature can be a material that does not promote cracking of methane and higher hydrocarbons present in the natural gas such as silica, chromia, calcia, alumina, magnesia, zirconia, titania, or mixtures thereof. The inert solid material can also be a catalytically inert material with respect to coke formation, such as platinum supported on zirconia. The solid material can be in the form of pellets, spheres, tablets, fluted rings, raschig rings, or extrudates. The size of solid material can vary from about 1/16 inch to about 1/2 inch. The solid material can also be in the form of a monolith such as a honeycomb or a porous foam.

The carburizing atmosphere is produced by reacting methane present in natural gas with carbon dioxide according to the following reaction:

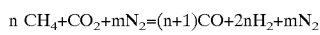

$$n\ CH_4 + CO_2 + mN_2 = (n+1)CO + 2nH_2 + mN_2$$

where n is the ratio of the moles (or volume) of methane employed per mole (or volume) of carbon dioxide. The amounts of methane and carbon dioxide employed in the reaction mixture is controlled in a way to avoid the presence of an excessive amount of carbon dioxide in the reaction product. Specifically, it is desirable to use a methane to carbon dioxide ratio, n close to 1 in the reaction mixture, to avoid the presence of an excessive amount of carbon dioxide in the reaction product. More specifically, it is desirable to use a methane to carbon dioxide ratio n between 1.0 to 1.2 in the reaction mixture to avoid the presence of excessive amount of carbon dioxide in the reaction product.

The value of m in the above reaction will depend upon the final amount of carbon monoxide needed in the carburizing atmosphere. For example, it will be close to 0 for producing a carburizing atmosphere with close to 50% carbon monoxide. Likewise, it will be close to 6 to produce a carburizing atmosphere containing close to 20% carbon monoxide. The value of m can, therefore, be varied between 0 and 6 to obtain the desired concentration of carbon monoxide in the carburizing atmosphere.

The amount of oxygen or air added to the natural gas, carbon dioxide and nitrogen gas mixture is controlled in a way that it is more than sufficient to prevent polymerization of hydrocarbons present in the natural gas and avoid formation of coke on the catalyst. Also, the amount of residual oxygen present in the non-cryogenically generated nitrogen that is mixed with a natural gas and carbon dioxide mixture is controlled in a way that it is more than sufficient to prevent polymerization of hydrocarbons present in the natural gas and avoid formation of coke on the catalyst.

The amount of nitrogen (or non-cryogenically generated nitrogen) added to the reaction mixture depends upon the nature of the carburizing atmosphere. There is no need to add nitrogen to the reaction mixture for producing an accelerated carburizing atmosphere containing more than about 45% carbon dioxide. The amount of nitrogen added to the reaction mixture for producing a carburizing atmosphere containing less than 45% carbon monoxide can be determined, based on the desired amount of carbon monoxide in the reaction product.

The natural gas used for producing a carburizing atmosphere is similar to that commercially available in the market. It can be purified natural gas containing primarily methane. The commercial grade natural gas can contain impurities in the form of heavier hydrocarbons such as ethane and propane and oxidants such as carbon dioxide, together with low levels of nitrogen gas as an impurity. The preferred concentration of methane in the commercial grade natural gas can vary from about 85 mol % to about 99 mol %. The preferred concentration of ethane as an impurity can vary from about 0.5 mol % to about 7 mol % and that of propane from about 0.5 mol % to about 5 mol %. The concentration of carbon dioxide as an impurity can vary from about 0.1 mol % to about less than about 1 mol %. Likewise, the concentration of moisture as an impurity can vary from about 0.1 mol % to less than about 1 mol %. In addition, the natural gas may contain low levels of sulfur and halogen compounds as impurities.

The carbon dioxide used for producing carburizing atmospheres can be pure carbon dioxide, commercial grade carbon dioxide, or from recycle sources of $CO_2$.

The reaction between natural gas and carbon dioxide to produce carburizing atmospheres is carried out in an externally heated reactor filled with a nickel-based or a platinum-based catalyst. The nickel-based catalyst can be selected from the group consisting of nickel supported on alumina or nickel-lanthanum supported on alumina. The loading of nickel on a nickel supported on alumina catalyst can vary from 2 to 60% by weight. Loading of nickel and lanthanum on a nickel-lanthanum supported on alumina catalyst can vary from 2 to 60% by weight and 1 to 20% by weight, respectively. The nickel on alumina or nickel-lanthanum on alumina catalyst used can be in the form of pellets, spheres, tablets, fluted rings, raschig rings, or extrudates. The size of catalyst can vary from about 1/16 inch to about 1/2 inch. The nickel catalyst can also be supported on a monolith such as a honeycomb or a porous foam.

The platinum-based catalyst can be platinum supported on zirconia. The loading of platinum supported on zirconia can vary from 0.1 to 1.0 by weight. The zirconia support can also contain 2 to 10% alumina by weight. The platinum-based catalyst can be in the form of pellets, spheres, tablets, fluted rings, raschig rings, or extrudates. The size of catalyst can vary from about 1/16 inch to about 1/2 inch. The platinum catalyst can also be supported on a monolith such as a honeycomb or a porous foam.

The externally heated catalytic reactor is operated at a temperature about 700° C. (1290° F.) to about 950° C. (1750° F.). Preferably, it is operated at a temperature from about 700° C. (1290° F.) to about 900° C. (1650° F.). More preferably, it is operated at a temperature from about 750° C. (1380° F.) to about 900° C. (1650° F.).

The pre-heater and externally heated reactor are operated at slightly over atmospheric pressure to minimize or eliminate chances of coke formation. Preferably, they are operated below about 10 psig pressure to minimize or eliminate chances of coke formation. More preferably, they are operated below about 5 psig pressure to minimize or eliminate chances of coke formation.

The hourly flow rate of gaseous mixture flowing through the high temperature catalytic reactor can vary from about 500 to 50,000 times the volume of the reactor occupied by the nickel-based or platinum-based catalyst. It can preferably vary from about 1,000 to 25,000 times the volume of the reactor occupied by the nickel-based or platinum-based catalyst. More preferably, it can vary from about 2,000 to 15,000 times the volume of the reactor occupied by the nickel-based or platinum-based catalyst.

The material used for fabricating the reactor can be any metallic material that can withstand high temperature operation with the exception of stainless steels. Stainless steels are defined as iron-chromium-nickel alloys containing less than 20% chromium and/or 30 wt % nickel. The reactor can be fabricated from stainless steel material provided the inner surface of the reactor is treated to render the surface to be inert. Such a surface treatment technique can include depositing an inert aluminum layer on the surface of stainless steel by known techniques. Preferably, the reactor is fabricated from high nickel containing alloys such as Inconel.

The reaction mixture can enter the reactor from the top and the product gas exit from the bottom. Alternatively, the reaction mixture can enter the reactor from the bottom and the product gas exit from the top.

The following examples are set forth to further illustrate the present invention.

In order to demonstrate the invention, a series of experiments were carried out in a specially designed bench-scale reactor consisting of two zones, a top pre-heating zone filled with a solid inert material or a catalyst and a lower reaction zone filled with a catalyst. The reactor was fabricated from a ⅜ inch diameter tube made out of Inconel material. It was mounted vertically and heated resistively from outside. The gaseous feed reaction mixture to the reactor was introduced from the top and the reaction product exited from the bottom. The top zone was designed to pre-heat the reaction mixture from ambient temperature to close to the reaction temperature by conduction and convection heat transfer. The reaction mixture already heated close to the desired reaction temperature was reacted in the presence of a catalyst. The reaction temperature in the reaction zone was maintained by monitoring and controlling it using a thermocouple. Finally, the reactor was operated at slightly over atmospheric pressure.

A number of nickel and platinum metal group catalysts were used in the pre-heating and reaction zones of the reactor to develop the processes of the present invention. The reaction mixture introduced from top of the reactor consisted of nitrogen, a small amount of oxygen, natural gas, and carbon dioxide or a small amount of oxygen, natural gas, and carbon dioxide.

Samples of reaction products were analyzed periodically for hydrogen, carbon monoxide, oxygen, carbon dioxide, moisture, and methane to determine catalyst effectiveness for producing carburizing atmospheres. Samples of spent inert material and catalysts employed in the pre-heating and reaction zones were analyzed after their use for signs of coke deposition.

EXAMPLE 1

A first control experiment to produce a carburizing atmosphere was carried out in a reactor operated at 750° C. (1380° F.) in which both pre-heating and reaction zones were filled with inert alumina particles. A mixture of nitrogen, natural gas, and carbon dioxide in the proportion of 3:1:1 was passed through the reactor to produce a carburizing atmosphere. There was no oxygen or air present in the reaction mixture in this experiment. The ratio of natural gas (assuming it to be pure methane) to carbon dioxide in the feed gas was 1. This ratio is equal to the one theoretically required to completely react methane with carbon dioxide to produce hydrogen and carbon monoxide. A gas hourly velocity, which was calculated based on the reaction zone volume, used in this example was 18,150 1/hr.

A detailed analysis of product gas exiting the reactor showed insignificant reaction between methane and carbon dioxide. There was insignificant formation of hydrogen, carbon monoxide, carbon dioxide, and moisture. Additionally, post examination of alumina particles showed no signs of coke formation on them.

This example clearly showed that alumina particles behaved as an inert material under the operation conditions used in this example, thus alumina particles do not promote coke formation.

EXAMPLE 2

A second control experiment similar to the one described in Example 1 was carried out to produce the carburizing atmosphere. The pre-heating zone of the reactor was filled with inert alumina particles; whereas, the reaction zone was filled with a nickel catalyst supported on alumina particles. The catalyst contained ~16% nickel by weight on alumina, and was supplied by Harshaw Chemical Company located in Cleveland, Ohio. A mixture of nitrogen, natural gas, and carbon dioxide in the proportion of 5:1:0.9 was passed through the reactor to produce a carburizing atmosphere containing close to 20% carbon monoxide. There was no oxygen or air present in the reaction mixture in this experiment. The reaction temperature used in this example was close to 800° C. (1470° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

A detailed analysis of product gas exiting the reactor revealed ~96% and ~94% conversion of natural gas and carbon dioxide, respectively. The product gas contained, by volume, ~20% by volume carbon monoxide, ~23% hydrogen, and 0.5% each of methane and carbon dioxide. Interestingly, however, the conversion of natural gas and activity of the catalyst began to drop-off dramatically after about 4 hours of continuous operation. The dramatic drop in activity of the catalyst was found to be attributed to coke formation on the catalyst particles.

This example showed that a reaction mixture containing nitrogen, natural gas and carbon dioxide cannot be used on a long-term basis to produce carburizing atmosphere. More specifically, it showed that a nickel-containing catalyst cannot be used to produce carburizing atmosphere from a mixture of nitrogen, natural gas and carbon dioxide using an 800° C. (1470° F.) reaction temperature.

EXAMPLE 3

A third control experiment similar to the one described in Example 1 was carried out to produce a carburizing atmosphere. The pre-heating zone of the reactor was filled with inert alumina particles; whereas, the reaction zone was filled with a nickel-lanthanum catalyst supported on alumina particles. The catalyst contained ~13% nickel and ~3% lanthanum by weight on alumina. The catalyst is marketed under a trade name DYCAT 894, and was supplied by Weskem-Hall, Inc. located in Dallas, Tex. A mixture of nitrogen, natural gas, and carbon dioxide in the proportion of 5:1:0.9 was passed through the reactor to produce the carburizing atmosphere containing close to 20% carbon monoxide. There was no oxygen or air present in reaction mixture in this experiment. The reaction temperature used in this example was close to 800° C. (1470° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

A detailed analysis of product gas exiting the reactor revealed ~96% and ~94% conversion of natural gas and carbon dioxide, respectively. The product gas contained, by volume, ~20% carbon monoxide and a hydrogen to carbon monoxide ratio of ~1.18. It also contained ~4,000 ppm moisture. Interestingly, however, the conversion of natural gas and activity of the catalyst began to drop-off dramatically after about 4 hours of continuous operation. The dramatic drop in activity of the catalyst was found to be attributed to coke formation on the catalyst particles.

This example showed that a reaction mixture containing nitrogen, natural gas and carbon dioxide cannot be used on a long-term basis to produce carburizing atmosphere. More specifically, it showed that a nickel-containing catalyst cannot be used to produce carburizing atmosphere from a mixture of nitrogen, natural gas and carbon dioxide using an 800° C. (1470° F.) reaction temperature.

EXAMPLE 4

A fourth control experiment similar to the one described in Example 1 was carried out to produce a carburizing atmosphere. The pre-heating zone of the reactor was filled with inert alumina particles; whereas, the reaction zone was filled with DYCAT 894 catalyst. A mixture of nitrogen, ultra high purity (UHP) methane, and carbon dioxide in the proportion of 5:1:0.9 was passed through the reactor to produce the carburizing atmosphere containing close to 20% by volume carbon monoxide. There was no oxygen or air present in the reaction mixture in this experiment. The reaction temperature used in this example was close to 800° C. (1470° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~95% and ~92% conversion of natural gas and carbon dioxide, respectively. The product gas contained, by volume, ~19% carbon monoxide and a hydrogen to carbon monoxide ratio of ~1.18.. It also contained ~3,500 ppm moisture. Interestingly, however, the conversion of UHP methane and activity of the catalyst began to drop-off dramatically after about 14 hours of continuous operation. The dramatic drop in activity of the catalyst was found to be attributed to coke formation on the catalyst particles.

This example showed that a reaction mixture containing nitrogen, UHP methane and carbon dioxide cannot be used on a long-term basis to produce carburizing atmosphere. More specifically, it showed that a nickel-containing catalyst cannot be used to produce carburizing atmosphere from a mixture of nitrogen, UHP methane and carbon dioxide using an 800° C. (1470° F.) reaction temperature.

EXAMPLE 5

A fifth control experiment similar to the one described in Example 1 was carried out to produce an accelerated carburizing atmosphere. The pre-heating zone of the reactor was filled with inert alumina particles; whereas, the reaction zone was filled with DYCAT 894 catalyst. A mixture of natural gas and carbon dioxide in the proportion of 1:1 was passed through the reactor to produce the accelerated carburizing atmosphere containing close to 50% by volume carbon monoxide. There was no oxygen or air present in the reaction mixture in this experiment. The reaction temperature used in this example was close to 850° C. (1560° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~79% and ~90% conversion of natural gas and carbon dioxide, respectively. The product gas contained, by volume, ~48% carbon monoxide and ~47% hydrogen. Interestingly, however, the conversion of natural gas and activity of the catalyst began to drop-off dramatically after about 1 hour of operation. The dramatic drop in activity of the catalyst was found to be attributed to coke formation on the catalyst particles.

This example showed that a reaction mixture containing natural gas and carbon dioxide cannot be used on a long-term basis to produce accelerated carburizing atmosphere. More specifically, it showed that a nickel-containing catalyst cannot be used to produce accelerated carburizing atmosphere from a mixture of natural gas carbon dioxide using an 850° C. (1560° F.) reaction temperature.

EXAMPLE 6

An experiment similar to the one described in Example 2 was carried out to produce a carburizing atmosphere. The pre-heating zone of the reactor was filled with inert alumina particles; whereas, the reaction zone was filled with DYCAT 894 catalyst. A mixture of nitrogen, natural gas, and carbon dioxide in the proportion of 5:1:0.9 was passed through the reactor to produce the carburizing atmosphere containing close to 20% carbon monoxide. The reaction mixture was mixed with close to 2% by volume oxygen in this experiment. The oxygen was added to the reaction mixture by blending oxygen with the nitrogen stream. The reaction temperature used in this example was close to 800° C. (1470° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~97% and ~85% conversion of natural gas and carbon dioxide, respectively. The product gas contained, by volume, 20% carbon monoxide, and a hydrogen to carbon monoxide ratio of close to 0.9. All the oxygen added to the reaction mixture was consumed. In addition, the product gas contained ~7,000 ppm moisture, which is well within the range acceptable for carburizing steel parts. The reaction was carried out continuously for 650 hours without any signs of decrease in the activity of the catalyst. More importantly, post examination of both alumina particles used for pre-heating the reaction mixture and nickel catalyst for producing carburizing atmosphere showed no signs of coke formation after 650 hours of continuous operation.

This example showed that a nickel-containing catalyst can be used on a long-term basis to produce a carburizing atmosphere from a mixture of nitrogen, natural gas, and carbon dioxide provided a small amount of oxygen is added to the reaction mixture. More specifically, it showed that a nickel-containing catalyst can be used to produce a carburizing atmosphere from a mixture of nitrogen, natural gas, and carbon dioxide using an 800° C. (1470° F.) reaction temperature provided about 2% oxygen is added to the reaction mixture to avoid catalyst deactivation by coke formation.

EXAMPLE 7

Another experiment similar to the one described in Example 2 was carried out to produce a carburizing atmosphere. The pre-heating zone of the reactor was filled with inert alumina particles; whereas, the reaction zone was filled with a nickel catalyst supported on alumina particles. The catalyst contained ~16% nickel by weight on alumina, and was supplied by Harshaw Chemical Company located in Cleveland, Ohio. A mixture of nitrogen, natural gas, and carbon dioxide in the proportion of 5:1:0.9 was passed through the reactor to produce the carburizing atmosphere containing close to 20% by volume carbon monoxide. The reaction mixture was mixed with close to 2% by volume oxygen in this experiment. The oxygen was added to the reaction mixture by blending oxygen with the nitrogen stream. The reaction temperature used in this example was close to 900° C. (1650° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed close to 100% conversion of natural gas and ~87% conversion of carbon dioxide. The product gas contained, by volume, ~21% carbon monoxide and a is hydrogen to carbon monoxide ration of close to 0.9. All the oxygen added to the reaction mixture was consumed. The reaction was carried out continuously for 240 hours without any signs of decrease in the activity of the catalyst. More importantly, post examination of both alumina particles used for pre-heating the reaction mixture and nickel catalyst for producing carburizing atmosphere showed no signs of coke formation after 240 hours of continuous operation.

This example showed that a nickel-containing catalyst can be used on a long-term basis to produce carburizing atmosphere from a mixture of nitrogen, natural gas, and carbon dioxide provided a small amount of oxygen is added to the reaction mixture. More specifically, it showed that a nickel-containing catalyst can be used to produce carburizing atmosphere from a mixture of nitrogen, natural gas, and carbon dioxide using 900° C. (1650° F.) reaction temperature provided about 2% by volume oxygen is added to the reaction mixture to avoid catalyst deactivation by coke formation.

EXAMPLE 8

Yet another experiment similar to the one described in Example 2 was carried out to produce a carburizing atmosphere. The pre-heating zone of the reactor was filled with an experimental platinum catalyst supported on zirconium particles; whereas, the reaction zone was filled with DYCAT 894 catalyst. A mixture of nitrogen, natural gas, and carbon dioxide in the proportion of 5:1:0.9 was passed through the reactor to produce the carburizing atmosphere containing close to 20% by volume carbon monoxide. The reaction mixture was mixed with close to 2% by volume oxygen in this experiment. The oxygen was added to the reaction mixture by blending oxygen with the nitrogen stream. The reaction temperature used in this example was close to 800° C. (1470° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~98% and ~88% conversion of natural gas and carbon dioxide, respectively. The product gas contained, by volume, ~20% carbon monoxide and a hydrogen to carbon monoxide ration of close to 0.9. All the oxygen added to the reaction mixture was consumed. The product gas also contained ~8,000 ppm moisture, which is well within the range acceptable for carburizing steel parts. The reaction was carried out continuously for 672 hours without any signs of decrease in the activity of the catalyst. More importantly, post examination of both platinum on zirconia catalyst used for pre-heating the reaction mixture and nickel catalyst for producing carburizing atmosphere showed no signs of coke formation after 672 hours of continuous operation.

This example showed that a combination of platinum-containing catalyst in the pre-heating zone and a nickel-containing catalyst in the reaction zone can be used on a long-term basis to produce carburizing atmosphere from a mixture of nitrogen, natural gas, and carbon dioxide provided a small amount of oxygen is added to the reaction mixture. More specifically, it showed that the above combination of catalysts can be used to produce carburizing atmosphere from a mixture of nitrogen, natural gas, and carbon dioxide using an 800° C. (1470° F.) reaction temperature provided about 2% by volume oxygen is added to the reaction mixture to avoid catalyst deactivation by coke formation.

EXAMPLE 9

Still another experiment similar to the one described in Example 2 was carried out to produce a carburizing atmosphere. In this example, both the pre-heating and the reaction zones of the reactor was filled with an experimental platinum catalyst supported on zirconium particles. The platinum catalyst contained 0.5% by weight platinum on zirconium. A mixture of nitrogen, natural gas, and carbon dioxide in the proportion of 5:1:0.9 was passed through the reactor to produce the carburizing atmosphere containing close to 20% by volume carbon monoxide. The reaction mixture was mixed with close to 2% by volume oxygen in this experiment. The oxygen was added to the reaction mixture by blending oxygen with the nitrogen stream. The reaction temperature used in this example was close to 800° C. The flow rate of gaseous feed mixture to the reactor was selected to provide a gas hourly space velocity (GHSV) of 6,800 1/hr. The GHSV is calculated by dividing flow rate of gaseous feed mixture by volume of the platinum on zirconium catalyst used in the reaction zone.

The detailed analysis of product gas exiting the reactor revealed ~95% and ~85% conversion of natural gas and carbon dioxide, respectively. The product gas contained, by volume, ~20% carbon monoxide and a hydrogen to carbon monoxide ration of close to 0.9. All the oxygen added to the reaction mixture was consumed. The reaction was carried out continuously for 942 hours without any signs of decrease in the activity of the catalyst. More importantly, post examination of platinum on zirconia catalyst used the pre-heating and reaction zones showed no signs of coke formation after 942 hours of continuous operation.

This example showed that a platinum-containing catalyst on zirconia can be used on a long-term basis to produce carburizing atmosphere from a mixture of nitrogen, natural gas, and carbon dioxide provided a small amount of oxygen is added to the reaction mixture. More specifically, it showed that the above catalysts can be used to produce carburizing atmosphere from a mixture of nitrogen, natural gas, and carbon dioxide using an 800° C. (1470° F.) reaction temperature provided about 2% by volume oxygen is added to the reaction mixture to avoid catalyst deactivation by coke formation.

EXAMPLE 10

A further experiment similar to the one described in Example 6 was carried out to produce an accelerated carburizing atmosphere. The pre-heating zone of the reactor was filled with inert alumina particles; whereas, the reaction zone was filled with DYCAT 894 catalyst. A mixture of nitrogen, natural gas, and carbon dioxide in the proportion of 4:3:3 was passed through the reactor to produce the accelerated carburizing atmosphere containing close to 37% by volume carbon monoxide. The reaction mixture was mixed with close to 2% oxygen in this experiment. The oxygen was added to the reaction mixture by blending oxygen with the nitrogen stream. The reaction temperature used in this example was close to 850° C. (1560° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~96% and ~91% conversion of natural gas and carbon dioxide, respectively. The product gas contained, by volume, ~39% carbon monoxide and ~37% hydrogen. All the oxygen added to the reaction mixture was consumed. In addition, the product gas contained ~10,600 ppm moisture, which is well within the range acceptable for carburizing steel parts. The reaction was carried out continuously for 306 hours without any signs of decrease in the activity of the catalyst. More importantly, post examination of both alumina particles used for pre-heating the reaction mixture and nickel catalyst for producing carburizing atmosphere showed no signs of coke formation after 306 hours of continuous operation.

This example showed that a nickel-containing catalyst can be used on a long-term basis to produce an accelerated carburizing atmosphere from a mixture of nitrogen, natural gas, and carbon dioxide provided a small amount of oxygen is added to the reaction mixture. More specifically, it showed that a nickel-containing catalyst can be used to produce an accelerated carburizing atmosphere from a mixture of nitrogen, natural gas, and carbon dioxide using an 850° C. (1560° F.) reaction temperature provided about 2% by volume oxygen is added to the reaction mixture to avoid catalyst deactivation by coke formation.

EXAMPLE 11

Another experiment similar to the one described in Example 10 was carried out to produce an accelerated carburizing atmosphere. The pre-heating zone of the reactor was filled with inert alumina particles; whereas, the reaction zone was filled with DYCAT 894 catalyst. A mixture of nitrogen, natural gas, and carbon dioxide in the proportion of 2:4:4 was passed through the reactor to produce the accelerated carburizing atmosphere containing close to 44% carbon monoxide. The reaction mixture was mixed with close to 1% by volume oxygen in this experiment. The oxygen was added to the reaction mixture by blending oxygen with the nitrogen stream. The reaction temperature used in this example was close to 850° C. (1560° F.). The flow rate of gaseous feed mixture to the reactor was selected to provide a gas hourly space velocity is (GHSV) of 6,800 1/hr. The GHSV is calculated by dividing flow rate of gaseous feed mixture by volume of the reactor occupied by the nickel catalyst.

The detailed analysis of product gas exiting the reactor revealed ~90% and ~92% conversion of natural gas and carbon dioxide, respectively. The product gas contained, by volume, ~45% carbon monoxide and ~44% hydrogen. All the oxygen added to the reaction mixture was consumed. In addition, the product gas contained ~10,600 ppm moisture, which is well within the range acceptable for carburizing steel parts. The reaction was carried out continuously for 40 hours without any signs of decrease in the activity of the catalyst. More importantly, post examination of both alumina particles used for pre-heating the reaction mixture and nickel catalyst for producing carburizing atmosphere showed no signs of coke formation after 40 hours of continuous operation.

This example showed that a nickel-containing catalyst can be used on a long-term basis to produce an accelerated carburizing atmosphere from a mixture of nitrogen, natural gas, and carbon dioxide provided a small amount of oxygen is added to the reaction mixture. More specifically, it showed that a nickel-containing catalyst can be used to produce an accelerated carburizing atmosphere from a mixture of nitrogen, natural gas, and carbon dioxide using 850° C. (1560° F.) reaction temperature provided at least about 1% by volume oxygen is added to the reaction mixture to avoid catalyst deactivation by coke formation.

EXAMPLE 12

Another experiment similar to the one described in Example 10 was carried out to produce an accelerated carburizing atmosphere. The pre-heating zone of the reactor was filled with inert alumina particles; whereas, the reaction zone was filled with a nickel catalyst supported on alumina particles. The catalyst contained ~16% nickel by weight on alumina, and was supplied by Harshaw Chemical Company located in Cleveland, Ohio. A mixture of natural gas and carbon dioxide in the proportion of 1:1 was passed through the reactor to produce the accelerated carburizing atmosphere containing close to 50% by volume carbon monoxide. The reaction mixture was mixed with close to 2% by volume oxygen in this experiment. The oxygen was added to the reaction mixture by blending oxygen with the nitrogen stream. The reaction temperature used in this example was close to 900° C. (1650° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~95% and ~96% conversion of natural gas and carbon dioxide, respectively. The product gas contained, by volume, ~50% carbon monoxide and a hydrogen to carbon monoxide ratio of ~0.95. All the oxygen added to the reaction mixture was consumed. The reaction was carried out continuously for 178 hours without any signs of decrease in the activity of the catalyst. More importantly, post examination of both alumina particles used for pre-heating the reaction mixture and nickel catalyst for producing carburizing atmosphere showed no signs of coke formation after 178 hours of continuous operation.

This example showed that a nickel-containing catalyst can be used on a long-term basis to produce an accelerated carburizing atmosphere from a mixture of natural gas and carbon dioxide provided a small amount of oxygen is added to the reaction mixture. More specifically, it showed that a nickel-containing catalyst can be used to produce an accelerated carburizing atmosphere from a mixture of natural gas and carbon dioxide using a 900° C. (1650° F.) reaction temperature provided about 2% by volume oxygen is added to the reaction mixture to avoid catalyst deactivation by coke formation.

EXAMPLE 13

Another experiment similar to the one described in Example 10 was carried out to produce cyclically an accelerated followed by normal carburizing atmospheres. The pre-heating zone of the reactor was filled with inert alumina particles; whereas, the reaction zone was filled with a nickel catalyst supported on alumina particles. The catalyst contained 16% nickel by weight on alumina, and was supplied by Harshaw Chemical Company located in Cleveland, Ohio. Initially a mixture of natural gas and carbon dioxide in the proportion of 1:1 was passed through the reactor to produce the accelerated carburizing atmosphere containing close to 50% by volume carbon monoxide. The reaction mixture was mixed with close to 2% by volume oxygen in this experiment. The oxygen was added to the reaction mixture by blending oxygen with the nitrogen stream. The reaction temperature used in this example was close to 900° C. (1650° F.). The flow rate of gaseous feed mixture to the reactor was selected to provide a gas hourly space velocity (GHSV) of 6,800 1/hr. The GHSV is calculated by dividing flow rate of gaseous feed mixture by volume of the reactor occupied by the nickel catalyst.

The detailed analysis of product gas exiting the reactor revealed ~95% and ~96% conversion of natural gas and carbon dioxide, respectively. The product gas contained, by volume, 50% carbon monoxide and a hydrogen to carbon monoxide ratio of ~0.95. All the oxygen added to the reaction mixture was consumed. The reaction was continued for 1 hour without any signs of decline in catalytic activity.

After producing accelerated carburizing atmosphere for 1 hour, the feed gas composition was switched to produce a normal carburizing atmosphere. Specifically, a mixture of nitrogen, natural gas, and carbon dioxide in the proportion of 5:1:0.9 was passed through the reactor to produce the carburizing atmosphere containing close to 20% by volume carbon monoxide. The reaction mixture was mixed with close to 2% by volume oxygen in this experiment. The oxygen was added to the reaction mixture by blending oxygen with the nitrogen stream. The reaction temperature close to 900° C. (1650° F.) was maintained to produce the normal carburizing atmosphere. The flow rate of gaseous feed mixture to the reactor was also maintained to provide a gas hourly space velocity (GHSV) of 6,800 1/hr.

The detailed analysis of product gas exiting the reactor revealed close to 100% conversion of natural gas and ~87% conversion of carbon dioxide. The product gas contained, by volume, ~21% carbon monoxide and a hydrogen to carbon monoxide ration of close to 0.9. All the oxygen added to the reaction mixture was consumed. The reaction was carried out continuously for 24 hours without any signs of decrease in the activity of the catalyst.

After 24 hours of producing normal carburizing atmosphere, the above cycle of producing accelerated followed by normal carburizing atmospheres was repeated five more times for a total of 192 hours of continuous operation. Post examination of both alumina particles used for pre-heating the reaction mixture and nickel catalyst for producing carburizing atmosphere showed no signs of coke formation after 192 hours of continuous operation.

This example showed that a nickel-containing catalyst can be used on a long-term basis to cyclically produce an accelerated followed by a normal carburizing atmosphere from a mixture of natural gas and carbon dioxide and nitrogen, natural gas and carbon dioxide, respectively, provided a small amount of oxygen is added to the reaction mixture.

From the forgoing description and examples it has been shown that carburizing atmosphere can be produced according to the invention that are based upon reacting oxygen and natural gases in the presence of an inert material or a non-nickel-based catalyst without forming coke which would deactivate the catalyst.

From the foregoing description the present invention results in processes for producing carburizing atmospheres with consistent quality and composition. Furthermore, processes according to the invention produce carburizing atmospheres that; (1) are not dependent on changes in the composition of air, (2) do not require expensive unit operations to remove unreacted carbon dioxide, and (3) are not prone to frequent catalyst deactivation by coke formation.

Although the present invention describes processes for producing carburizing atmospheres, the processes can be easily extended for producing atmospheres for annealing, brazing, sintering and neutral hardening ferrous and non-ferrous metals and alloys. For example, these atmospheres can be produced simply by diluting the carburizing atmosphere with nitrogen. Alternatively, they can be produced by a) using a stream containing 2–14% natural gas, 1–13% carbon dioxide, 73–97% nitrogen, to which is added 1–5% by volume oxygen, b) pre-heating the stream prepared in step a) to a temperature of between 750° C. (1380° F.) and 950° C. (1750° F.) in the presence of a material that promotes reaction between oxygen and natural gas without forming coke and c) reacting the pre-heated mixture of step b) at temperature in the presence of a nickel-containing or platinum-containing catalyst.

Having thus described our invention what is desired to be secured by Letters Patent of the United States is set forth in the appended claims which should be read without limitation.

What is claimed:

1. A process for producing a carburizing atmosphere comprising the separate and distinct steps of:
   a) preparing a mixture consisting of, by volume, 14 to 50% natural gas, 13 to 50% carbon dioxide, 0 to 73% nitrogen, to which is added between 1% and 5% by volume oxygen
   b) pre-heating said mixture prepared in step a) to a temperature of between 750° C. (1380° F.) and 950° C. (1750° F.) in the presence of an inert solid material selected from the group consisting of silica, chromia, calcia, alumina, magnesia, zirconia, titania, platinum supported on zirconia and mixtures thereof that promotes reaction between oxygen and natural gas without forming coke to form a pre-heated effluent; and c) reacting said pre-heated effluent of step (b) at temperature in the presence of a catalyst selected from the group consisting of nickel supported on alumina and platinum supported on zirconia, to produce said carburizing atmosphere.

2. A process according to claim 1, including the step of preparing said mixture with a methane to carbon dioxide ratio of from 0.9 to 1.2.

3. A process according to claim 1, including the step of preparing said mixture, with a nitrogen to natural gas to carbon dioxide ratio of 5:1:0.9 and pre-heating said mixture to a temperature of about 800° C. (1470° F.).

4. A process according to claim 1, including the step of preparing said mixture with a nitrogen to natural gas to carbon dioxide ratio of 5:1:0.9 and pre-heating said mixture to a temperature of about 900° C. (1650° F.).

5. A process according to claim 1, including the step of preparing said mixture with a nitrogen to natural gas to carbon dioxide ratio of 4:3:3 and pre-heating said mixture to a temperature of about 850° C. (1560° F.).

6. A process according to claim 1, including the step of preparing said mixture with a nitrogen to natural gas to carbon dioxide ratio of 0:1:1 and pre-heating said mixture to a temperature of about 900° C. (1650° F.).

7. A process according to claim 1, including the step of introducing said atmosphere into a carburizing furnace.

8. A process according to claim 1, including carrying out steps b and c in a two stage reactor heated to a temperature of from 800° C. (1470° F.) to 900° C. (1650° F.).

9. A process according to claim 1, including selecting said nickel based catalyst from the group consisting of 2 to 60% by weight nickel supported in alumina, 2 to 60% by weight nickel and 1 to 20% by weight lanthanum supported in alumina, said catalyst having a form being one of pellets, spheres, tablets, fluted rings, raschig rings, extruclate with a particle size of between 1/16 and 1/2 inches or a monolith being one of a honeycomb or a porous foam.

10. A process according to claim 1, including selecting said platinum based catalyst from the group consisting of 0.1 to 1.0% by weight platinum supported on zirconia and 0.1 to 1.0% by weight platinum supported on zirconia containing from 2 to 10% by weight alumina said catalyst having a form being one of pellets, spheres, tablets, fluted rings, raschig rings, extrudate with a particle size of between 1/16 and 1/2 inches or a monolith being one of a honeycomb or a porous foam.

11. A process for producing a carburizing atmosphere comprising the separate and distinct steps of:

a) preparing a mixture consisting of, by volume, trom 14 to 50% methane, 13 to 50% carbon dioxide and 20 to 73% nitrogen containing 1 to 5% by volume residual oxygen b) pre-heating said mixture prepared in step a) to a temperature of between 750° C. (1380° F.) and 950° C. (1750° F.) in the first stage of a two stage reactor charged with an inert solid catalyst material selected from the group consisting of silica, chromia, calcia, alumina, magnesia, zirconia, titania, platinum supported on zirconia, and mixtures therof, to promote reaction between oxygen and natural gas without forming coke; and c) reacting said pre-heated mixture of step (b) at temperature in the second stage of said two stage reactor in the presence of a catalyst selected from the group consisting of nickel supported on alumina and platinum supported on zirconia to produce said carburizing atmosphere.

12. A process according to claim 11, including the step of preparing said mixture with a methane to carbon dioxide ratio of from 0.9 to 1.2.

13. A process according to claim 11, including the step of preparing said mixture, with a nitrogen to natural gas to carbon dioxide ratio of 5:1:0.9 and pre-heating said mixture to a temperature of about 800° C. (1470° F.).

14. A process according to claim 11, including the step of preparing said mixture with a nitrogen to natural gas to carbon dioxide ratio of 5:1:0.9 and pre-heating said mixture to a temperature of about 900° C. (1650° F.).

15. A process according to claim 11, including the step of preparing said mixture with a nitrogen to natural gas to carbon dioxide ratio of 4:3:3 and pre-heating said mixture to a temperature of about 850° C. (1560° F.).

16. A process according to claim 11, including the step of preparing said mixture with a nitrogen to natural gas to carbon dioxide ratio of 0:1:1 and pre-heating said mixture to a temperature of about 900° C. (1650° F.).

17. A process according to claim 11, including the step of introducing said atmosphere into a carburizing furnace.

18. A process according to claim 11, including carrying out steps b and c in said two stage reactor heated to a temperature of from 800° C. (1470° F.) to 900° C. (1650° F.).

19. A process according to claim 11, including selecting said nickel based catalyst from the group consisting of 2 to 60% by weight nickel supported in alumina, 2 to 60% by weight nickel ind 1 to 20% by weight lanthanum supported in alumina, said catalyst having a form being one of pellets, spheres, tablets, fluted rings, raschig rings, or extrudate with a particle size of between 1/16 and 1/2 inches, or a monolith being one of a honeycomb or a porous foam.

20. A process according to claim 11, including selecting said platinum based catalyst from the group consisting of 0.1 to 1.0% by weight platinum supported on zirconia and 0.1 to 1.0% by weight platinum supported on zirconia containing from 2 to 10% by weight alumina said catalyst having a form being one of pellets, spheres, tablets, fluted rings, raschig rings, or extrudate with a particle size of between 1/16 and 1/2 inches, or a monolith being one of a honeycomb or a porous foam.

21. A process for producing a carburizing atmosphere for accelerated carburizing comprising the separate and distinct steps of;

a) preparing a mixture of essentially equal parts of natural gas and carbon dioxide to which is added approximately 1–5% by volume oxygen;

b) pre-heating said mixture prepared in step a) to a temperature of between 750° C. (1380° F.) and 950° C. (1750° F.) in the presence of an inert solid catalyst material selected from the group consisting of silica, calcia, alumina, magnesia, zirconia, titania, platinum supported on zirconia, and mixtures thereof, to promote reaction between oxygen and natural gas without forming coke; and c) reacting said pre-heated mixture of step (b) at temperature in the presence of a catalyst selected from the group consisting of nickel supported on alumina and platinum supported on zirconia to produce said carburizing atmosphere.

22. A process according to claim 21, including the step of introducing said mixture into a carburizing furnace maintained at a temperature of about 900° C. (1650° F.).

23. A method for carburizing ferrous metal articles comprising the step of heating said articles to a temperature of from 800° C. (1470° F.) to 950° C. (1750° F.) under an atmosphere produced by the separate and distinct steps of:
   a) preparing a mixture consisting of, by volume, 14 to 50% natural gas, 13 to 50% carbon dioxide, 0 to 73% nitrogen to which is added up to 1–5% by volume oxygen;
   b) pre-heating said mixture prepared in step a) to a temperature of between 750° C. (1380° F.) and 950° C. (1750° F.) in the presence of an inert solid catalyst material selected from the group consisting of silica, calcia, alumina, magnesia, zirconia, titania, platinum supported on zirconia, and mixtures thereof, to promote reaction between oxygen and natural gas without forming coke;
   c) reacting said pre-heated mixture of step (b) at temperature in the presence of a catalyst selected from the group consisting of nickel supported on alumina and platinum supported on zirconia to produce said carburizing atmosphere; and
   thereafter holding said articles at temperature and for a time to effect carburnization of said articles to a desired depth.

24. A method for carburizing ferrous metal articles comprising the steps of heating said article to a temperature of from 800° C. (1470° F.) to 950° C. (1750° F.) and an atmosphere produced by:
   a) preparing a mixture of essentially equal parts of natural gas and carbon dioxide to which is added approximately 1–5% by volume oxygen;
   b) pre-heating said mixture prepared in step a) to at temperature of between 750° C. (1380° F.) and 950° C. (1750° F.) in the presence of an inert solid catalyst material selected from the group consisting of silica, calcia, alumina, magnesia, zirconia, titania, platinum supported on zirconia, and mixtures thereof, to promote reaction between oxygen and natural gas without forming coke;
   c) after said pre-heating is completed reacting said pre-heated mixture of step (b) at temperature in the presence of a catalyst selected from the group consisting of nickel supported on alumina and platinum supported on zirconia to produce said carburizing atmosphere for a time sufficient to effect accelerated carburizing,
   thereafter continuing said heating for a time at temperature to effect carburization of said articles to a desired depth under an atmosphere produced by the separate and distinct steps of:
   a) preparing a mixture consisting of, by volume, 14 to 50% natural gas, 13 to 50% carbon dioxide, 0 to 73% nitrogen to which is added up to 1–5% by volume oxygen;
   b) pre-heating said mixture prepared in step a) to a temperature of between 750° C. (1380° F.) and 950° C. (1750° F.) in the presence of an inert solid catalyst material selected from the group consisting of silica, calcia, alumina, magnesia, zirconia, titania, platinum supported on zirconia, and mixtures thereof, to promote reaction between oxygen and natural gas without forming coke; and
   c) reacting said pre-heated mixture of step (b) at temperature in the presence of a catalyst selected from the group consisting of nickel supported on alumina and platinum supported on zirconia to produce said carburizing atmosphere.

25. A process for producing a carburizing atmosphere comprising the separate and distinct steps of:
   a) preparing a mixture consisting of, by volume, 14 to 50% natural gas, 13 to 50% carbon dioxide, 0 to 73% nitrogen, to which is added between 1% and 5% by volume oxygen;
   b) pre-heating said mixture prepared in step a) to a temperature of between 750° C. (1380° F.) and 950° C. (1750° F. ) in the presence of a catalyst selected from the group consisting of silica, alumina, calcia. magnesia, zirconia, titania, platinum supported on zirconia and mixtures thereof to promote reaction between oxygen and natural gas without forming coke in the first stage of a two stage reactor; and
   c) reacting said pre-heated mixture of step (b) at temperature of between 750° C. (1380° F.) and 950° C. (1750° F.) in the presence ol a catalyst selected from the group consisting of nickel supported on alumina and platinum supported on zirconia in the second stage of a two stage reactor to produce said carburizing atmosphere.

26. A process according to claim 25, including the step of preparing said mixture with a methane to carbon dioxide ratio of from 0.9 to 1.2.

27. A process according to claim 25, including the step of preparing said mixture, with a nitrogen to natural gas to carbon dioxide ratio of 5:1:0.9 and pre-heating said mixture to a temperature of about 800° C. (1470° F.).

28. A process according to claim 25, including the step of preparing said mixture with a nitrogen to natural gas to carbon dioxide ratio of 5:1:0.9 and pre-heating said mixture to a temperature of about 900° C. (1650° F.).

29. A process according to claim 25, including the step of preparing said mixture with a nitrogen to natural gas to carbon dioxide ratio of 4:3:3 and pre-heating said mixture to a temperature of about 850° C. (1560° F.).

30. A process according to claim 25, including the step of preparing said mixture with a nitrogen to natural gas to carbon dioxide ratio of 0:1:1 and preheating said mixture to a temperature of about 900° C. (1650° F.).

31. A process according to claim 25, including the step of introducing said atmosphere into a carburizing furnace.

32. A process according to claim 25, including selecting said nickel based catalyst from the group consisting of 2 to 60% by weight nickel supported in alumina, 2 to 60% by weight nickel and 1 to 20% by weight lanthanum supported in alumina, said catalyst having a form being one of pellets, spheres, tablets, fluted rings, raschig rings, extrudate with a particle size of between 1/16 and 1/2 inches or a monolith being one of a honeycomb or a porous foam.

33. A process according to claim 25, including selecting said platinum based catalyst from the group consisting of 0.1 to 1.0% by weight platinum supported on zirconia and 0.1 to 1.0% by weight platinum supported on zirconia containing from 2 to 10% by weight alumina, said catalyst having a form being one of pellets, spheres, tablets, fluted rings, raschig rings, extrudate with a particle size of between 1/16 and 1/2 inches or a monolith being one of a honeycomb or a porous foam.

34. A process for producing a carburizing atmosphere comprising the separate and distinct steps of:
   a) preparing a mixture consisting of, by volume, from 14 to 50% methane, 13 to 50% carbon dioxide and 20 to 73% nitrogen containing 1 to 5% by volume residual oxygen;
   b) pre-heating said mixture prepared in step a) in the first stage of a two stage reactor to a temperature of between 750° C. (1380° F.) and 950° C. (1750° F.) in the presence of an inert solid catalyst material selected from the group consisting of silica, alumina, calcia magnesia, zirconia titania, platinum supported on zirconia and mixtures thereof to promote reaction between oxygen and natural gas without forming coke; and c) reacting said pre-heated mixture of step (b) in the second stage of a two stage reactor at a temperature of between 750° C. (1380° F.) and 950° C. (1750° F.) in the presence of a catalyst selected from the group consisting of nickel supported on alumina and platinum supported on zirconia to produce said carburizing atmosphere.

35. A process according to claim 34, including the step of preparing said mixture with a methane to carbon dioxide ratio of from 0.9 to 1.2.

36. A process according to claim 34, including the step of preparing said mixture, with a nitrogen to natural gas to carbon dioxide ratio of 5:1:0.9 and pre-heating said mixture to a temperature of about 800° C. (1470° F.).

37. A process according to claim 34, including the step of preparing said mixture with a nitrogen to natural gas to carbon dioxide ratio of 5:1:0.9 and pre-heating said mixture to a temperature of about 900° C. (1650° F.).

38. A process according to claim 34, including the step of preparing said mixture with a nitrogen to natural gas to carbon dioxide ratio of 4:3:3 and pre-heating said mixture to a temperature of about 850° C. (1560° F.).

39. A process according to claim 34, including the step of preparing said mixture with a nitrogen to natural gas to carbon dioxide ratio of 0:1:1 and pre-heating said mixture to a temperature of about 900° C. (1650° F.).

40. A process according to claim 34, including the step of introducing said atmosphere into a carburizing furnace.

41. A process according to claim 34, including selecting said nickel based catalyst from the group consisting of 2 to 60% by weight nickel supported in alumina, 2 to 60% by weight nickel and 1 to 20% by weight lanthanum supported in alumina, said catalyst having a form being one of pellets, spheres, tablets, fluted rings, raschig rings, or extrudate with a particle size of between $1/16$ and $1/2$ inches, or a monolith being one of a honeycomb or a porous foam.

42. A process according to claim 34, including selecting said platinum based catalyst from the group consisting of 0.1 to 1.0% by weight platinum supported on zirconia and 0.1 to 1.0% by weight platinum supported on zirconia containing from 2 to 10% by weight alumina said catalyst having a form being one of pellets, spheres, tablets, fluted rings, raschig rings, or extrudate with a particle size of between $1/16$ and $1/2$ inches, or a monolith being one of a honeycomb or a porous foam.

* * * * *

UNITED STATES PATENT AND TRADEMARK OFFICE
CERTIFICATE OF CORRECTION

PATENT NO. : 6,287,393 B1
DATED : September 11, 2001
INVENTOR(S) : Garg et al.

It is certified that error appears in the above-identified patent and that said Letters Patent is hereby corrected as shown below:

Column 21,
Line 39, delete "extruclate" and substitute therefore -- extrudate --.

Column 22,
Line 32, delete "ind" and substitute therefore -- and --.

Signed and Sealed this

Twenty-sixth Day of February, 2002

Attest:

Attesting Officer

JAMES E. ROGAN
Director of the United States Patent and Trademark Office